May 5, 1964 R. W. KELNER ETAL 3,131,651
FOOD PREPARING UTENSIL
Filed May 8, 1962
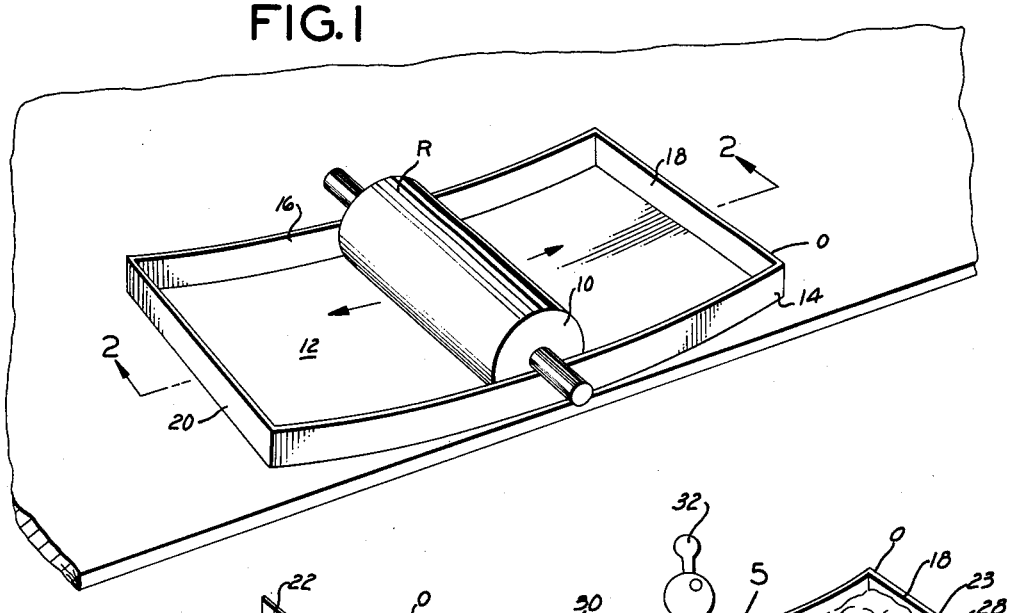
FIG. 1
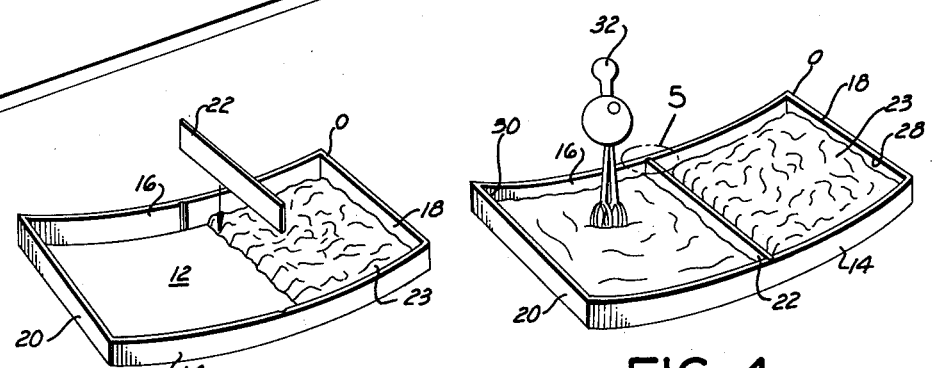
FIG. 3
FIG. 4
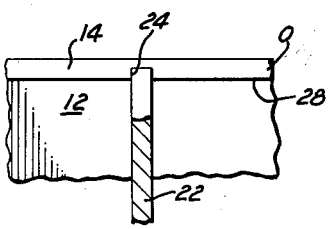
FIG. 5
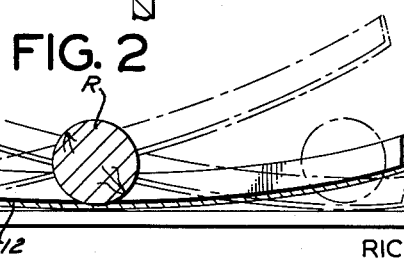
FIG. 2
INVENTOR.
RICHARD W. KELNER
IRVING H. STAMAN
WALTER E. HAMILTON, JR
BY: FULWIDER, MATTINGLY
& HUNTLEY
ATTORNEYS 3,131,651
FOOD PREPARING UTENSIL
Richard W. Kelner, Irving H. Staman, and Walter E. Hamilton, Jr., Garden Grove, Calif. (all of 3728 Atlantic Ave., Long Beach 7, Calif.)
Filed May 8, 1962, Ser. No. 193,134
2 Claims. (Cl. 107—1)

The present invention relates generally to the culinary art and more particularly to a new and novel utensil for forming and coating crumbed food products.

The preparation of certain foods requires that a food product such as crackers, dry breads and the like be first crumbed whereafter the crumbs are mixed with a batter or dip. The heretofore utilized utensils employed in such crumbing and dipping were not designed for this specific purpose. In particular, there has not been heretofore provided a single utensil capable of carrying out both crumbing and dipping. It is a major object of the present invention to provide such a novel utensil.

Another object of the present invention is to provide a utensil of the aforedescribed nature which may be economically produced by mass production methods so as to be marketable at a comparatively low price.

A further object of the present invention is to provide a utensil of the aforedescribed nature which is extremely compact thereby requiring minimum storage space.

An additional object of the present invention is to provide a utensil of the aforedescribed nature which may be readily cleaned after use.

A particular object of the present invention is to provide a utensil of the aforedescribed nature which considerably reduces the time heretofore required for crumbing and dipping food products.

These and other objects and advantages of the present invention will become apparent from the following detailed description, when taken in conjunction with the appended drawings wherein:

FIGURE 1 is a perspective view showing a preferred embodiment of the present invention;

FIGURE 2 is a vertical sectional view taken on line 2—2 of FIGURE 1;

FIGURE 3 is a perspective view showing a step in the use of said device;

FIGURE 4 is a perspective view similar to FIGURE 3 showing a subsequent step in the use of said device; and FIGURE 5 is a fragmentary enlarged plan view of the encircled area designated 5 in FIGURE 4.

Referring to the drawings, a utensil embodying a preferred form of the present invention is adapted for use in conjunction with a conventional rolling pin R. The utensil includes an open-topped receptacle O having a width somewhat greater than the length of the cylindrical roller 10 of the rolling pin R. The receptacle O includes a longitudinally curved flat bottom 12 provided with a pair of upstanding side walls 14 and 16. The receptacle also includes a pair of upstanding end walls 18 and 20 that extend between the opposite ends of the side walls 14 and 16. The receptacle may be formed of various rigid materials such as synthetic plastic, metal or wood.

The receptacle O is also provided with an upstanding separator plate 22 shown in FIGURES 3, 4 and 5. The separator plate 22 may be conveniently be formed of the same material as the aforedescribed elements of the receptacle O.

Referring to FIGURE 5, the ends of the separator plate 22 are vertically slidably received by slots 24 formed at the midportion of the side walls 14 and 16 whereby the separator plate may be readily engaged with and disengaged from the receptacle O.

In the use of the aforedescribed apparatus, the food product to be crumbed, as for example crackers, are deposited within the confines of the receptacle O. At this time the separator strip 22 is not in place within this receptacle. Thereafter, the rolling pin R is reciprocated longitudinally relative to the receptacle O. Such reciprocation serves to rock the receptacle O in the manner indicated in FIGURE 2. In this manner, the crackers are quickly and thoroughly crushed with the crumbs 23 thereby formed being forced towards the center of the receptacle.

After the crumbs 23 are formed they will be urged towards one end wall 18 of the receptacle O, as by means of the separator plate 22. Thereafter, the separator plate 22 will be lowered into place within the slots 24. This will serve to retain the crumbs 23 within a crumb-receiving chamber 28 that extends between one side of the separator strip 22 and the end wall 18.

Next, with the separator strip 22 remaining in place a batter or dip will be prepared within a batter-receiving chamber 30 that extends between the end wall 20 and the separator strip 22, as indicated in FIGURE 4. Preparation of the batter may be accomplished in a conventional manner, as by means of a mixer 32. Finally, after the batter has been prepared the separator strip 22 is withdrawn from the slots 24 whereby the batter and crumbs may be intermixed.

From the foregoing description it will be apparent that the device of the present invention affords an efficient and economical manner for forming and coating a crumbed food product.

Various modifications and changes may be made with respect to the foregoing detailed description without departing from the spirit of the present invention or the scope of the following claims.

We claim:

1. A device for use with a rolling pin to form and coat a crumbed food product, comprising: an open-topped receptacle for said food product having a longitudinally curved flat bottom, a pair of upstanding side walls and a pair of upstanding end walls, the width of said receptacle slightly exceeding the length of said rolling pin; an upstanding separator plate that extends across the width of said receptacle to define a crumbed food product-receiving chamber extending between one side of said separator plate and one of said end walls and a batter-receiving chamber extending between the opposite sides of said separator plate and the opposite of said end walls; and means on said receptacle releasably supporting said separator plate at the intermediate portion thereof, whereby said food product may first be crumbed within said receptacle by said rolling pin and said separator plate then being positioned between said side walls to separate said crumbed food product from said batter as the latter is prepared in said batter-receiving chamber, with said separator plate thereafter being removed from said receptacle and said crumbed food product and batter being intermixed within said receptacle.

2. A device as set forth in claim 1 wherein said last-mentioned means comprises a pair of longitudinally aligned vertical slots formed at the midportion of said side walls to vertically slidably receive the ends of said separator plate.

References Cited in the file of this patent
UNITED STATES PATENTS

| | | |
|---|---|---|
| 948,434 | Scott | Feb. 8, 1910 |
| 2,081,078 | Watson | May 18, 1937 |
| 2,616,391 | Russell | Nov. 4, 1952 |

FOREIGN PATENTS

| | | |
|---|---|---|
| 49,592 | Austria | Aug. 25, 1911 |